United States Patent [19]
Pierre

[11] Patent Number: 4,531,882
[45] Date of Patent: Jul. 30, 1985

[54] STABILIZED LOAD HANDLING VEHICLE WITH ORIENTABLE ARM

[76] Inventor: Gibert Pierre, "Les Biches" Douvaine, FR 74140 Saint Cergues, France

[21] Appl. No.: 516,063

[22] Filed: Jul. 22, 1983

[30] Foreign Application Priority Data

Jul. 23, 1982 [FR] France ................. 82 13223

[51] Int. Cl.³ ............................................. E02F 9/08
[52] U.S. Cl. .................... 414/687; 280/475; 212/189
[58] Field of Search ............ 414/687, 694, 744 R, 414/685; 212/189; 280/43.24, 475; 254/418

[56] References Cited

U.S. PATENT DOCUMENTS

| | | | |
|---|---|---|---|
| 4,360,311 | 11/1982 | Dufour | 414/694 X |
| 4,395,191 | 7/1983 | Kaiser | 414/694 |
| 4,401,408 | 8/1983 | Gibert | 414/687 |

FOREIGN PATENT DOCUMENTS

| | | | |
|---|---|---|---|
| 1050078 | 1/1954 | France | 414/694 |
| 1012159 | 12/1965 | United Kingdom | 414/694 |
| 1165944 | 10/1969 | United Kingdom | 414/694 |

Primary Examiner—Terrance L. Siemens
Attorney, Agent, or Firm—Dowell & Dowell

[57] ABSTRACT

A load handling vehicle having two mutually articulated chassis elements respectively carrying ground engaging wheels and a drive motor, the first chassis element carrying a prop located below the articulation pivot and moveable between a raised retracted position and a downwardly extended work position in which the prop raises the wheels of the second chassis element from the ground so that the second chassis element can be rotated about the articulation pivot to angularly position a load bearing arm carried by the second chassis element with respect to the longitudinal axis of the vehicle.

6 Claims, 7 Drawing Figures

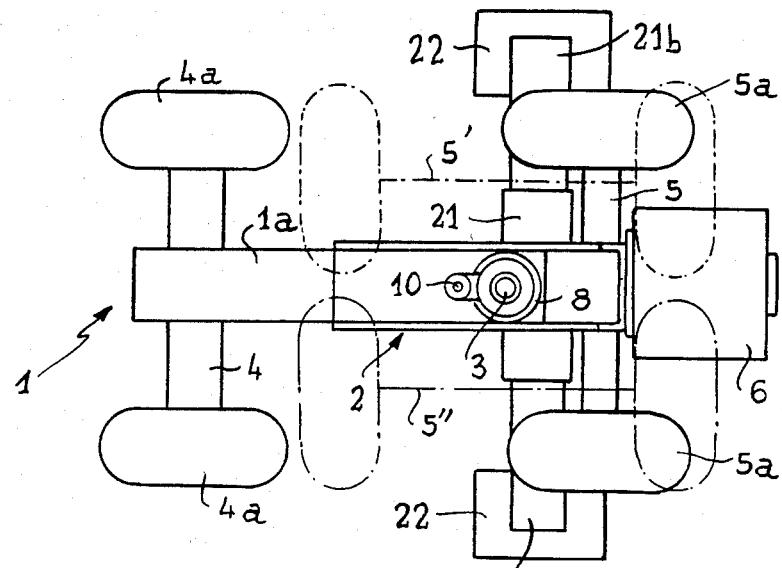
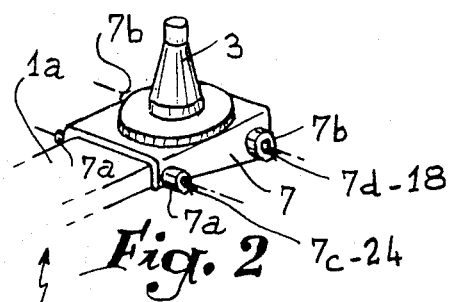
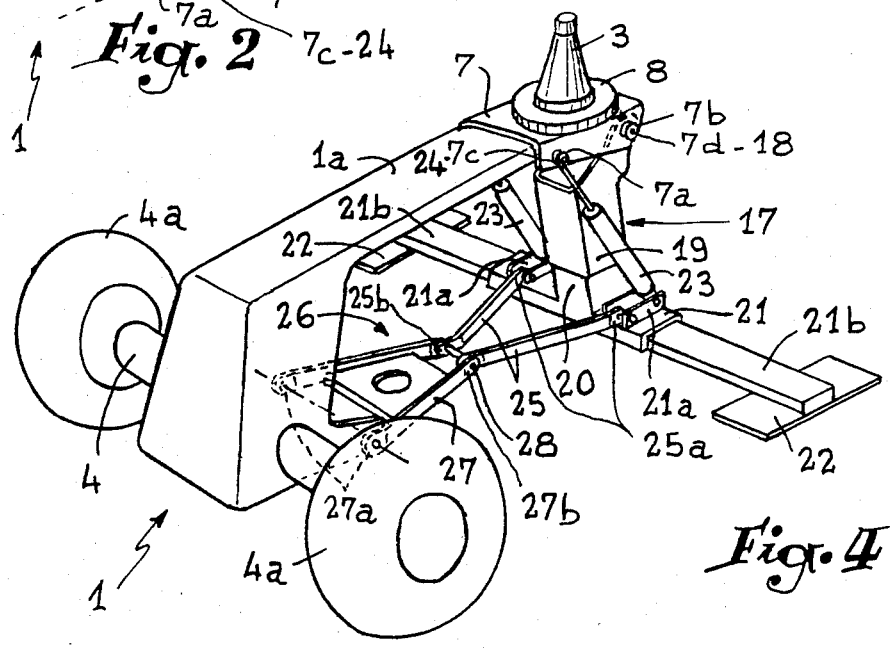

STABILIZED LOAD HANDLING VEHICLE WITH ORIENTABLE ARM

The search for the maximum utilization of storage space volumes or work surfaces means that the handling apparatus and the like are required to move in spaces which are more and more reduced on the horizontal plane, and that articles are stored higher and higher.

The problem of stability of these machines and therefore of safety is extremely important.

Moreover, in order to reduce the movements and manoeuvres which fork lift trucks must make, it is desirable, both from the standpoint of reducing the available ground surface and from that of time-saving, to employ handling apparatus incorporating orientable load bearing arms.

However, all these desiderata must not increase the cost of the apparatus in question.

Handling and earthworking machines are known which incorporate a chassis composed of two elements articulated about a vertical axis, the machine providing clearance which is profitably used to extend the field of action of the bearing arm and its equipment by elevating a mobile element of the machine. U.S. Pat. No. 4,082,197 to Stadman is illustrative of this subject. However, the vertical articulations of such machines, generally made to provide steering thereof on the highway, often offer only a very limited variation of the orientation of the work equipment.

The present invention aims at overcoming the drawbacks of the known handling apparatus and at allowing production of a lifting machine which is very simple to produce so that its cost price is low, while at the same time providing a machine which can take a front load and deposit it laterally at an angle of 90° on either side, or vice versa.

To this end, the machine according to the invention comprises in known manner a chassis composed of two articulated elements in which the orientation for steering on the highway is obtained by a conventional rear axle. In work position, the central articulation pivot serves to orientate a turret bearing case supporting the equipment and the rear wheels. However, the narrow design of its chassis and the position to the rear of the pivot for orientation of the equipment results in providing, contrary to the conventional concepts, a rotation of 90° on either side of its longitudinal axis.

In this case, transverse stability is ensured by a telescopic prop of the chassis which tips into a work position to orientate substantially normally with respect to the ground, its free end being fixed to a horizontal crosspiece parallel to the prop's axis of articulation which abuts on the ground to ensure this stability.

Moreover, the articulation of the prop is located adjacent to the pivot so that the forces and the reaction of the ground are transmitted directly therebetween, thus concentrating the points of resistance and reducing the cost of the structure of the machine.

In addition, it will be noted that the linkage means constituting the second connection between the front element of the chassis and the bottom of the prop is provided so as to absorb the reaction torque of the turret bearing the equipment. Finally, the ground engaging shoes of the prop are advantageously disposed behind the front wheels, i.e. in the raised position of the prop wherein the ground clearance of the machine is large, so that they constitute mud guards. By reason of this position, it goes without saying that these shoes constitute no parasitic drug hindering the movement of the machine on muddy or weakly bearing land, i.e. in which it is easy to sink.

The machine according to the invention is characterized in that the first chassis element bearing the articulation pivot is provided with a prop which tips from a folded position to a position of use in which it is roughly normal with respect to the ground with a view to wedging said prop so that the wheels of the second chassis element are lifted off of the ground in the known manner. The articulation of the prop on the first element is located below and slightly to the rear of the chassis pivot.

The accompanying drawing, given by way of example, will enable the invention, the characteristics that it presents and the advantages that it may procure to be more readily understood.

FIG. 2 is a view in perspective on a larger scale of the articulation pivot of the two elements of the chassis of the machine according to the invention.

FIG. 4 is a view in perspective of the first element of the chassis bearing the pivot, shown in the work position of the machine.

FIG. 5 is a plan view of the handling machine illustrated in FIG. 3 but in which the load bearing arm and its accessories have not been shown.

Figure 1:
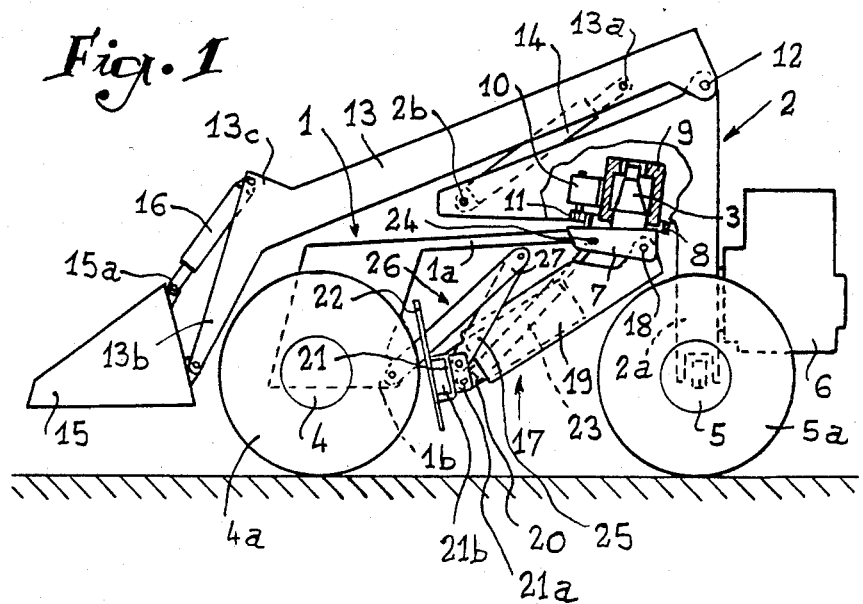
FIG. 1 is a side view with parts broken away of a machine according to the invention.

The handling machine according to the invention essentially comprises a chassis made in known manner by means of two elements 1 and 2 articulated one with respect to the other in a horizontal plane by means of a vertical pivot 3 forming part of the front element 1 of the chassis. The chassis elements are provided with two axles 4, 5 at the ends of which wheels 4a, 5b are mounted. The wheels 4a, wheels 5a, or the assembly of wheels 4a and 5a are driven by known means with a propulsion motor 6. It is noted that the gauge of the two axles is identical.

It is observed that the front chassis element 1 which is made in the form of a narrow box is constituted at its upper part by a roughly horizontal flat arm portion 1a whose free end bears a plate 7 (FIG. 2) at the centre of which the vertical pivot 3 rises. It is observed that the plate 7 is made in the form of a downwardly opening U, of which the flanges are provided with bosses 7a, 7b whose centre is hollow to form two transverse parallel bores 7c, 7d. It is noted that the bore 7d is located beyond pivot 3 in the direction of the free end of arm portion 1a.

The top of the plate 7 carries a ring gear 8 centred with respect to the pivot 3 and whose role will be better explained hereinafter.

The second element 2 of the chassis is also made in the form of a narrow box presenting in profile the form of a right-angled triangle from the apex of the right angle of which, there extends downwardly a leg 2a at the end of which the axle 5 is mounted.

Chassis element 2 is further provided with a bearing case 9, FIG. 1, adapted to be supported on the pivot 3 to permit rotation of this element 2 with respect to element 1, in well known manner. Element 2 supports a hydraulic motor 10 on the driven shaft of which is carried a pinion 11 adapted to cooperate with the teeth of the ring 8, so that when this motor is set in motion, the rotation of the element 2 with respect to element 1 is achieved. The top of element 2 located above the leg 2a carries a horizontal pin 12 pivotally supporting a load bearing arm 13 positioned by a hydraulic jack 14 whose cylinder is articulated about a pin 2b fixed to the box 2, whilst the end of its piston cooperates with a pivot pin 13a of arm 13. The free end of the latter carries a bucket or other handling or gripping tool of general reference 15. The latter is articulated at the end 13b of the arm 13 about which it may tip due to the presence of a hydraulic jack 16 disposed between a fork joint 13c of the arm 13 and a pin 15a of the tool 15.

According to the invention, a prop 17 is articulated about a pin 18 engaged in the two opposite bores 7d of the plate 7. This prop is telescopic, i.e. it comprises a hollow member 19 of which one of the ends made in the form of a fork cooperates with pin 18, whilst its opposite, open end telescopically receives a member or foot 20 adapted to slide freely inside the first 19.

As illustrated more particularly in FIG. 4, it is observed that the foot 20 is made in the form of an inverted T having a transverse branch or sole 21 bearing at each of its ends a transverse shoe 22.

It will be noted that the transverse branch 21 of the foot 20 is also telescopic, i.e. it comprises two end parts 21b sliding with respect to the transverse branch 21 proper and bearing the shoes 22. In other words, the end parts 21b can be extended tranversely from the branch 21 to increase the stability of the apparatus in work position (FIGS. 4 and 5), and can be moved inwardly to positions retracted (FIGS. 6 and 7).

Figure 6:
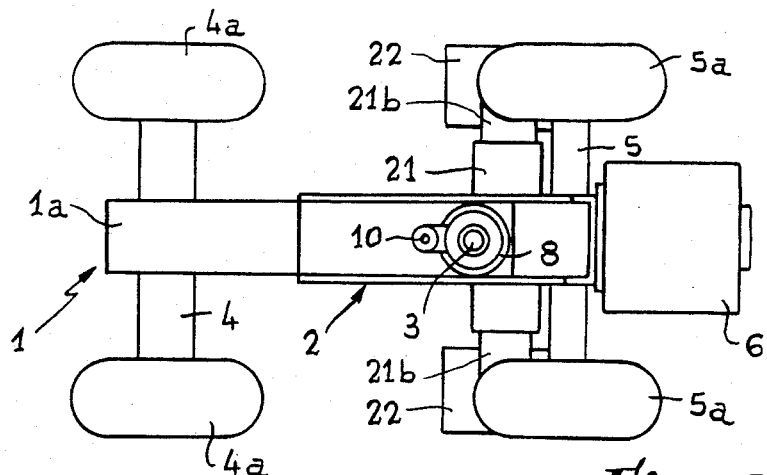
FIGS. 6 and 7 are views similar to that of FIG. 5, but showing the shoes retracted and raised, respectively.
Figure 7:
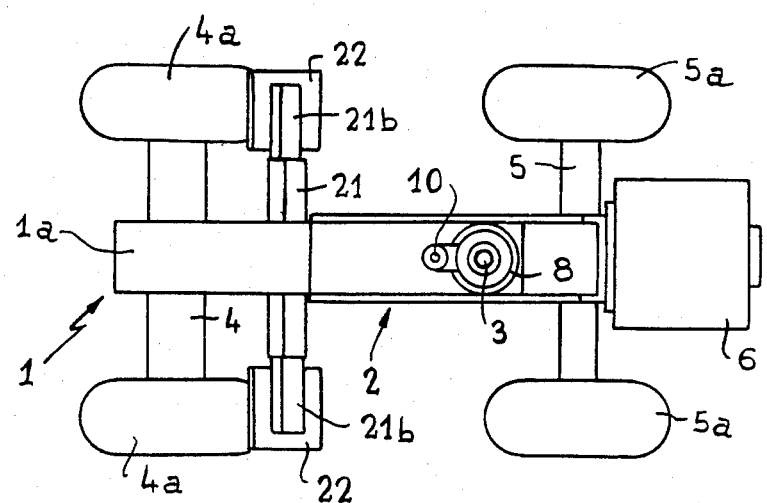

It is observed that, in FIGS. 6 and 7, the shoes 22 are located in line with or behind the track of the wheels 4a and 5a, i.e. their spaced apart relationship in retracted position is equal to the gauge of the machine and their width is equal to or smaller than the thickness of the tyres of said wheels. Thus, in the raised folded position of the prop, the shoes 22 constitute mud-guards for wheels 4a (FIG. 1).

Figure 3:
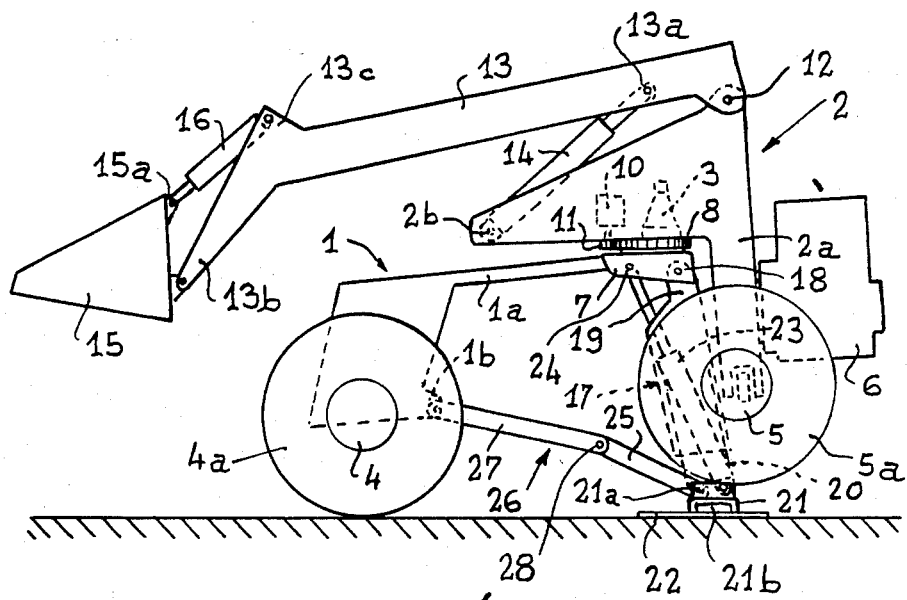
FIG. 3 is a view similar to that of FIG. 1, but illustrating the machine in the work position.

On each side of the central base of the foot 20 are located two fork joints 21a in each of which is articulated the cylinder of a hydraulic jack 23 of which the piston rod oscillates about a pin 24 engaged in the opposite bores 7c of the plate 7. In FIGS. 1 and 3, only one jack 23 is used of which the end of the rod is articulated about pin 24, whilst its cylinder is mounted to oscillate with respect to the base of the foot 20.

In each fork joint 21a is also articulated the first branch 25 of a pair of linkages 26 of which the other branch 27 is articulated on lugs 1b on the element 1 of the chassis.

It is observed that the linkage branches 25 and 27 are each made in the form of a triangular element of truncated apex, each element forming a horizontal beam of equal resistance. Each of the triangular elements is FIG. 4 lies at the level of its base lugs 25a, 27a articulated respectively on the fork joints 21a and lugs 1b. The apices of the elements are articulated together via a pin 28 which passes through end lugs 25b, 27b of each of them.

As illustrated in FIGS. 5, 6 and 7, elements 1 and 2 of the chassis are made extremely narrow.

Operation is as follows:

In highway position, as illustrated in FIG. 1, the machine moves with its four wheels in contact with the ground. Change in direction may then be obtained in conventional fashion, in the manner of an automobile, by stearing wheels 4a or wheels 5a mounted on stub axles.

Once the work site has been reached, the jacks 23 are pressurized so that they expand. Consequently, rearward tipping of the prop 17 about its pin 18 is actuated, which involves the extension of the foot 20 until the shoes 22, suitably spaced apart therefrom, come into contact with the ground, then, the stroke of the jacks continuing, the rear wheels 5a lift as shown in FIG. 3. Of course, it must be considered that the terms rear and front are evoked only to give an example of construction, the opposite may also be effected.

The two branches 25, 27 of the linkages 26 are positioned as illustrated in FIG. 3 forming therebetween an obtuse angle so that they are not aligned.

The jacks 23 are provided so as to be self-blocking in their two end positions in order to avoid having to provide any other device for locking in these positions. Thus, in work position, even if there is a sudden drop in oil pressure, the machine remains in that position as long as the jack has not been otherwise pressurized positively. These jacks being well known in the art, it is not necessary to describe them in greater detail.

Finally, the particular function of the linkages 26 will be noted, whose attachments with the chassis element 1 of the machine and with the prop 17 are spaced apart in order to counteract the major part of the rotation torque communicated by the load bearing arm 13 in the course of operation.

When it is desired to move the tool 15 laterally, it suffices to supply the hydraulic motor 10 to cause rotation of the element 2. Because of the arrangement according to the invention, the lifting arm 13 may rotate through an angle of 90° on each side of the longitudinal axis of the machine. As has been illustrated in FIG. 5, when the orientation of the chassis element 2 makes a right angle with chassis element 1, it is observed that the corresponding axle 5 comes into position 5' or 5", wherein the dimensions of the wheels 5a in width remain substantially included wherein the maximum gauge of wheels 4a.

It must, moreover, be understood that the foregoing description has been given only by way of example and that it in no way limits the domain of the invention which would not be exceeded by replacing the details of execution described by any other equivalents.

I claim:

1. A self-stabilizing load lifting and handling machine of the type having a narrow chassis having two articulated chassis elements respectively carrying two longitudinally spaced pairs of ground engaging wheels which are transversely spaced by a gauge which is wide as compared with the width of the chassis, comprising:
    a first chassis element carrying a first axle supporting a first pair of said wheels, the first chassis element including a horizontal chassis arm portion spaced above the ground and having a free end spaced longitudinally away from the first axle, and said free end supporting a vertically oriented chassis articulation pivot;
    a second chassis element overlying said free end of the first chassis element and articulated thereto about said pivot, and including a leg portion extending downwardly beyond said free end of the first chassis element and carrying a second axle supporting the second pair of wheels;

motor means on the chassis including means operative to rotate the second chassis element about the pivot relative to the first chassis element;

a load handling arm horizontally pivoted at one end to said second chassis element and carrying work tool means at its other end;

a chassis supporting inverted T-shaped prop having a central member with an upper end horizontally hinged to said free end of the horizontal chassis arm portion, the prop being operative to pivot between a retracted position in which its lower end is raised to lie beneath said horizontal chassis arm portion and a work position in which it extends upright with its other end against the ground, the inverted T-shaped prop including transverse branches disposed normal to said central member and extending at least to the width of the gauge of the wheels;

jack means extending from said horizontal chassis arm portion to said prop and selectively actuatable by a drive means to move the prop between said retracted and work positions; and foldable linkage means coupled between the first chassis element and the inverted T-shaped prop and being operative to counteract rotational torque tending to twist the prop when the second chassis element is rotated about the first.

2. The machine as claimed in claim 1, wherein the central member of the T-shaped prop is telescopic between its upper and lower ends, the jack means being connected between the horizontal chassis arm portion and said lower end, whereby the jack means when actuated first moves the prop from its retracted to its upright work position and then telescopes the lower end downwardly to raise the second pair of wheels from the ground.

3. The machine as claimed in claim 1, wherein said jack means for pivoting the T-shaped prop are of a type which is self-blocking when not being actuated to move.

4. The machine as claimed in claim 1, wherein said foldable linkage means comprise two truncated triangular branches pivoted together at their smaller ends, the larger end of one branch being pivotally connected near the lower end of the T-shaped prop and the larger end of the other branch being pivotally connected to the first chassis element near the first axle.

5. The machine as claimed in claim 1, wherein said transversely extending opposite branches of the T-shaped prop carry ground engaging shoes spaced by at least the width of the gauge of the wheels, the shoes being located when the prop is in retracted position such that they are disposed behind the wheels of the first pair and comprise mud guards.

6. The machine as claimed in claim 5, wherein the second chassis element is shaped such that when it is pivoted to through 90° with respect to the first chassis element, the second pair of wheels lies entirely within the width gauge of the wheels of the first pair.

* * * * *